COLOR TELEVISION IMAGE TUBE AND SYSTEM THEREFOR

Filed Sept. 14, 1953

INVENTOR.

[signature]

United States Patent Office 2,863,937

Patented Dec. 9, 1958

2,863,937

COLOR TELEVISION IMAGE TUBE AND SYSTEM THEREFOR

Meguer V. Kalfaian, Los Angeles, Calif.

Application September 14, 1953, Serial No. 379,783

7 Claims. (Cl. 178—5.4)

Figure 1:
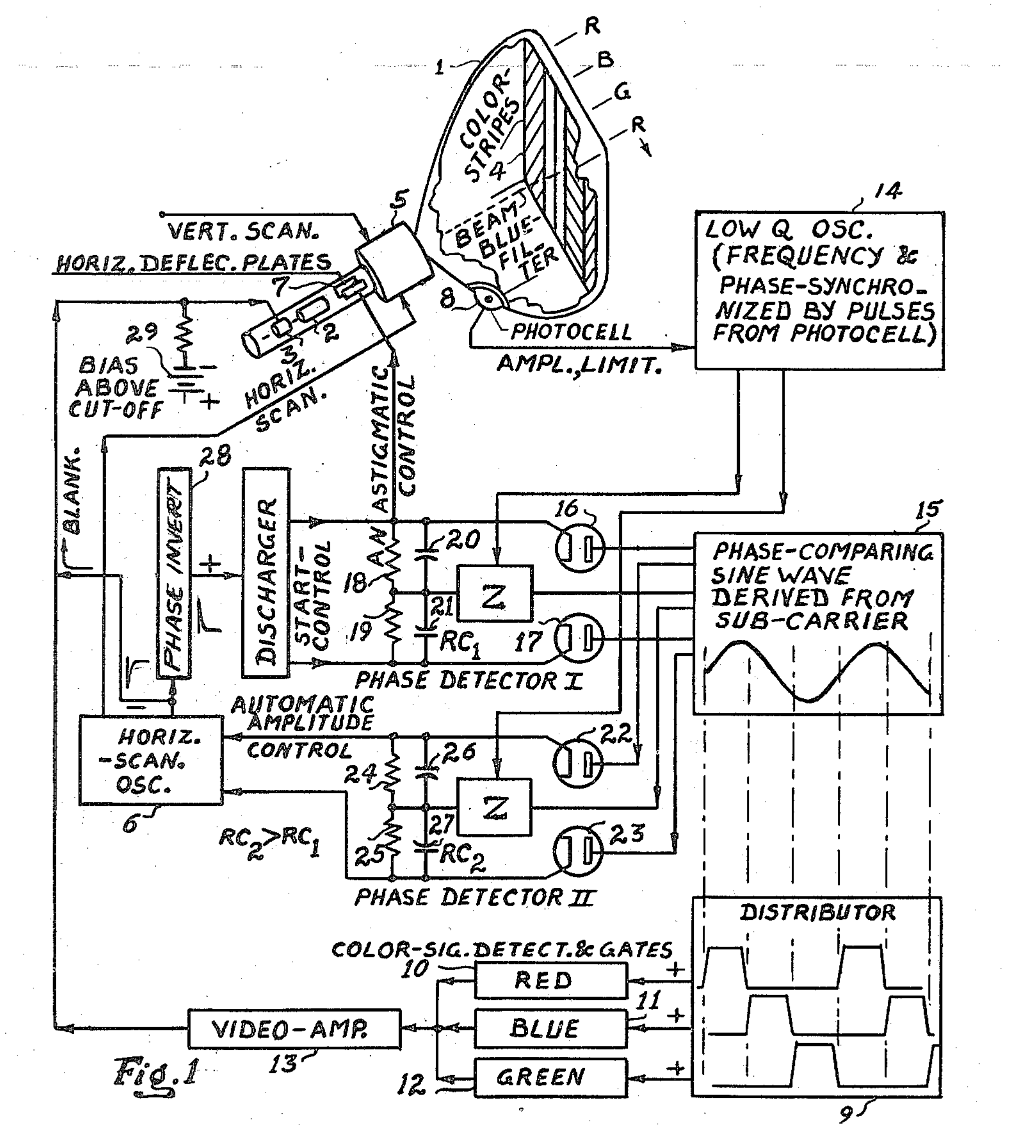

The present invention relates to color television, and more particularly to image reproducing devices in natural color. Its main object is to provide methods and means for controlling accurate synchronism between elemental primary-color illuminations on the viewing screen and the elemental primary-color components of the received signals, whereby faithful reproduction of colored pictures may be obtained on the viewing screen. Another object is to produce colored pictures with a relatively simple tube structure, employing a simple color screen, and a single electron beam within that tube, and an electronic synchronizing means associated therewith, for controlling color registry under all normally manifested variables of time, amplitude, and amplitude geometric distortion.

Various types of image reproducing tubes in natural colors have been previously proposed, the noted ones of which fall in two classes. The first falls in a class in which the emitted color is controlled by deflection of the beam in the immediate vicinity of the phosphor screen. The second falls in a class in which one or more beams converge to a point at aperture mask, and pass therethrough divergent upon individual dots of color phosphors. A more complete specification of these two types may be referred, in respective order, to the following: PDF Chromatron, by Robert Dressler, Proc. IRE, vol. 41, p. 851, July 1953; and Aperture-Mask Kinescopes, by B. E. Barnes et al, RCA Review, vol. XII, p. 593, September 1951.

A study of these two types of image reproducing cathode ray tubes indicate that, the mechanical structures associated with the color screens are of highly precision types, which in combination with other imperfections deviate from the ideal simplicity of monochrome tubes, in view of performance, apparatus adjustments, and manufacturing speed. Accordingly, the present invention is concerned with methods and means to improve the operation of color image reproducing systems, and particularly first, to abviate any unconventional element that may be utilized to intercept the beam before reaching a simple color screen, and second, to control color registry by an electronic servo system that is remote from the tube structure.

The color screen comprises an early type of repeating groups of parallel-ruled sequential primary-color phosphor stripes printed either on the inner surface of the face plate, or on a separate flat glass plate. The phosphor lines are arranged in vertical direction to the picture-scanning raster, so that as the beam scans horizontally there are produced short pulses of illumination at a high frequency rate. The illumination of one of the three primary colors, for example, the blue color, is converted into electrical pulses by a blue-filtered photocell, mounted inside of the tube, and the frequency of these pulses is compared with a standard image-switching frequency (which may be derived from the transmitted sub-carrier wave), for deriving servo-voltages that are functions of any of forward or backward misalignments of color registry. These servo-voltages are then fed back through a first branch in slow-changing values to control the horizontal deflection amplitude, and through a second branch in rapid-changing values to control the anastigmatism of horizontal deflection; this latter control starting anew after each retrace period. Owing to the fact that normal operating conditions are usually widely different from those required at the start of each horizontal scanning, a pair of electrostatic beam-deflecting plates (in horizontal direction) is included in the tube, so that fast beam positioning may be accomplished by servo-voltages arriving from the anastigmatic control. The spacing between these plates may be very narrow, as the maximum beam-deflection required by these plates may be about the maximum deviation from a straight line described by an astigmatic horizontal yoke coil. If widely spaced electrostatic deflection plates were practical with the conventional monochrome tube design, then the anastigmatic servo-voltages could be magnified, and the amplitude control servo-voltages eliminated. However, the circuitry associated with the presently proposed system is neither complicated nor expensive, and two separate controls may be preferable for improving performance.

A simultaneous system may be converted into a sequential color system at the receiving end by dividing the time period of each successive image element into three time steps, and feeding the three primary-color components of the image-element sequentially to the control grid of the image tube. For example, in the presently known NTSC simultaneous color system, each half-cycle period of the sub-carrier would be divided into three time steps for additive color. Thus, assuming that a synchronized sub-carrier at $f_{sc}$ is established at the receiving end, a comparison sine wave at $2f_{sc}$ may be derived for comparing and locking in, the time sequence of the blue-phosphor output pulses in synchronism with the blue-color time sequence at the intensity control grid of the image tube. Accordingly, it is another object of this invention to provide a versatile type of color image forming device, which is adaptable to either sequential or simultaneous systems.

Figure 2:
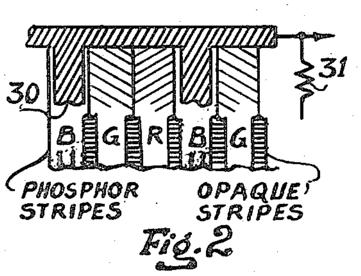
Figure 3:
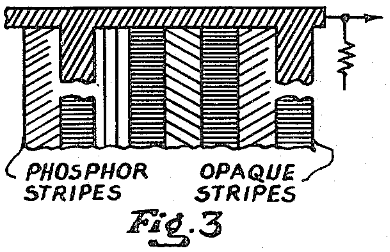

While certain preferred forms and arrangements of the invention will be included in the following specification, various other modifications will be apparent to the skilled in the art when read in connection with the accompanying drawings, and accordingly, the limitations of this invention will be defined in the appended claims. Thus in the annexed drawings: Fig. 1 shows diagrammatically a color-image reproducing tube and circuit arrangements therefor, in accordance with the invention; Fig. 2 is a modification of the color screen; and Fig. 3 is a modification of Fig. 2.

In reference to the arrangement of Fig. 1, there is shown an image reproducing cathode ray tube 1, which includes an electron beam forming gun 2, and an intensity control element 3; the emitting cathode element being avoided for simplicity of drawing. The electron beam is directed toward different areas of the image forming face plate 4 by horizontal and vertical beam-deflection coils, which are generally constructed in a single yoke form, as shown at 5, and mounted outside the neck of the tube. These coils are energized by two separate generators, such as shown by block 6 for horizontal scansion, and another (not shown) for vertical scanning. An auxiliary pair of electrostatic beam-deflecting plates 7 are included inside the neck of the tube, which are utilized to shift the position of the beam in horizontal direction for controlling elemental color registry, the function of which is to be described further. The color image forming face plate 4 comprises a multiplicity of repeating groups of adjacently positioned stripe-like sections of primary-color component areas that cross the lines of the scanning raster, and wherein each color area of a group is adapted to produce one of a primary-color illumination, for example, in a sequence of red; blue; and green, when impacted by the electron beam. This type of color image forming screen had been known previously, and accordingly, detailed specification as to its various forms need not be given herein. Two examples may be referred to patent issues: Goldsmith No. 2,431,115, November 18, 1947, and Weimer No. 2,545,325, the specifications of which, including all instrumentations and arrangements that may appear relative to the following portion of this specification, are hereby made part of this invention as if fully included herein.

In the funnel structure of the cathode ray tube 1, there is included a light sensitive element 8, of the photoelectric type, which faces the light illuminations of the color screen. There is interposed between the photocell and said illuminations, a color filter element, for example, the blue primary-color filter, so that the photocell responds only when the beam traverses the blue stripes on the image forming screen. Thus, as the beam forms a scanning raster on the image forming screen, the photocell produces a succession of output pulses, the frequency rate of which depends upon the frequency of line scanning, and the number of blue stripes that the beam scans per line. Following the present monochrome standard, wherein an image raster having four to three aspect ratio is produced with 525 separate scanning lines, it will be apparent that each scanning line must trace 700 elemental image areas on the image forming screen, or, as in the embodiment of the present invention, wherein each image is divided into three primary-color component areas, the beam must trace 2100 individual component color stripes during each line scanning (less the number of stripes that are lost during horizontal retrace period). Since the number of image elements received per second is predetermined, and the number of color stripes on the image forming screen is also predetermined, it becomes imperative that an arcuate amplitude control of the line scanning be provided, in order to obtain accurate synchronism between elemental primary-color illuminations and elemental primary-color component modulation. It is also imperative that a control means be provided for positioning the beam on the screen at the start of each scanning line, whereby the lines of the formed picture do not flicker in forward or backward movement.

In order to achieve this type of synchronization, it is first assumed that each received image element is produced at the receiving end in a predetermined sequence of first, second, and third primary-color component values, as effected by the distributor 9, at the three separate detectors 10, 11 and 12. The outputs of these detectors are sequentially amplified by a common video amplifier 13, and applied upon the intensity control element 3 of the cathode ray tube, for modulating the brilliance of elemental illumination on the screen. The beam is deflected across the image forming screen in the usual monochrome fashion, which in turn effects a series of output pulses from the photocell 8, as effected by the blue color elemental illuminations. These pulses are amplified, amplitude-limited, and applied upon a low Q sine wave oscillator 14, the frequency and phase of which is locked in, with the repetition rate of the pulses. Assuming an adoption of the present form of color image reproduction with the known type of NTSC simultaneous color transmission system, now standardized in the U. S. A., this system provides transmission of a constant frequency sub-carrier, which may be derived at the receiving end through transmitted bursts of sine waves during predetermined portions of the horizontal retrace periods. The frequency of this sub-carrier is half the maximum number of image elements that are allowed for transmission in the presently standardized 6 megacycle channel band. Accordingly, this sub-carrier is received and doubled in frequency in block

15, and applied upon first and second phase detectors, the first comprising rectifier tubes (which may be of the vacuum or crystal type) 16, 17 and output load circuit comprising resistances 18, 19 and parallel-connected condensers 20, 21; and the second comprising rectifiers 22, 23 and output load circuit comprising resistances 24, 25 and parallel-connected capacitors 26, 27. In this condition, the currents passing through each half section of either one of the detectors will be of equal values, and the output voltages will be zero. The output sine wave of the low Q oscillator is also applied upon the two phase detectors in a direction, in which the positive half-cycles are passed through both half sections simultaneously, and in the case where the two sine waves are displaced at 90 degrees, the voltages at the output loads of both detectors will again be zero. Thus, the sequence of primary-color component distribution at the detectors 10, 11 and 12 is so pre-arranged that, the peaks of the sine wave at block 15 occur at the on-switching of red and green component signals, for example, the red signal being switched on when the sine wave is at its positive peak, and the green signal being switched on when the sine wave is at its negative peak. In this condition, assuming that by any coincidence the sine wave from low Q oscillator is in 90 degree relation with the sine wave at block 15, the output loads of the first and second phase detectors will be zero, indicating that the elemental primary-color illumination on the image forming screen is in synchronism with the elemental primary-color component modulation of the beam-intensity control element 3. When this synchronism is deviated, the positive peaks of the sine wave from low Q oscillator will either shift toward the positive or negative peaks of the sine wave at block 15, and the zero voltage at the output loads of the first and second phase detectors will shift toward positive or negative direction. This voltage is applied upon the horizontal deflecting plates 7, so as to shift the beam position for establishing the required zero balance.

Uncontrolled normal operating conditions generally vary widely from the stringent requirements in a color image forming device of this type. Such wide variations require electrostatic beam-deflecting plates with wide spacing, so that wide variances of deflection amplitude may be either suppressed or expanded. This undesired condition may be obviated by employing two phase detectors, the output of the first being applied upon the electrostatic beam-deflection plates for small variations, such as beam positioning at the starting point of each line scanning, and also for controlling linearity of line scanning; and the output of the second being applied upon an amplitude control element of the horizontal deflection wave generator 6. Deflection wave generators are widely used in television systems, and these include amplitude control elements, and accordingly, these details are not included either in the present specification or in the accompanying drawings. For the purpose of reference, however, in general practice the amplification factor of a grid controlled vacuum tube is varied by varying either the grid bias or the screen grid voltage of pentodes, and the plate voltage of triodes, or the grid bias of high gain triodes. Accordingly, the output control voltage of the phase detector may be directly applied to vary any of these parameters in a suitable section of a conventional horizontal scanning-wave generator, without involving further modification of circuitry.

In order to avoid too jumpy positioning of the beam (back and forth movement of the beam), the output load of phase detector I is bypassed slightly. This condition however is inherently present due to distributed capacities, and only a balancing capacitor may be necessary; or, even this may be eliminated, since good control depends upon whether a servo-voltage is present or not, and accordingly accurate zero-balancing is not necessary. The RC time constant of the output load of phase detector II however, is adjusted much higher than of the former. This is because amplitude variation, due to various causes, occurs slowly, and once a good amplitude control is locked in, steady color registry will continue on. As in the former case, accurate balancing of the output load is not necessary. In order to hold the starting position of the beam constant at each line-scanning, any servo-voltage that may have been built up during line deflection is discharged during retrace period, as effected by a discharger activated by the positive horizontal retrace pulse. Since discharger devices are widely used in the electronics art (for example, a highly negative-biased grid-controlled vacuum tube connected across the output circuit of phase detector I, and causing it to dissipate any accumulated quantity by a line scansion positive retrace pulse applied upon said grid from phase inverter block 28), no details of same are given herein. This discharger element (shown in block diagram) however, may be dispensed with, since the horizontal retrace time period is sufficient to allow discharge of the capacitors 20 and 21 by resistors 18 and 19.

*Various modifications*

The low Q oscillator in Fig. 1 may be dispensed with, and only the pulses from the photocell 8 (after amplification and properly shaped, so that the rise and fall at the boundaries are equalized) may be applied upon the phase detectors I and II, since only unidirectional waves are necessary for the proper operation of these detectors. When the waveshape of these pulses is made constant, equalization at the boundaries is not important, since it is only necessary to adjust the phasing of the sine wave in block 15, for obtaining steady state reference voltage at the outputs of the phase detectors, as the determinant factor of color registry.

In order to obtain constant color-registry, it is essential that the beam has at least a minimum intensity during each elemental scansion upon the blue phosphor stripes, so that the photocell may be excited thereby. This may be easily accomplished by adjusting the grid bias 29 above cut-off value, and darkening the viewing screen by a value to threshold of visibility. Ordinarily however, the face plates of better made monochrome tubes have only 65% transparency, so that darkening of the face plate may not even be necessary. Satisfactory operation may also be obtained without said bias adjustment, since image illumination appears on the screen most of the time, and the amount of control obtained in such conditions may be found acceptable.

Methods and means for constructing cathode ray tubes including magnetic deflection means, in connection with auxiliary electrostatic deflection means have been known previously, for example, the color image reproducing cathode ray tube shown in Fig. 1, on page 546 of RCA Review, part II, vol XII, September 1951. Although the purpose and operation of apparatus and system of that tube is different than the one shown herein, nevertheless, due to functional relation, the apparatus structure of said plates in connection with the gun structure therefor, and its descriptive matter thereof, are made part of this application as if fully included herein.

The deflection yoke may be of the standard monochrome type, since first, in vertically aligned color stripes the stringent requirements on the amplitude of vertical deflection and yoke geometric distortion are eliminated, and second, the stringent requirements on the amplitude of horizontal deflection and yoke geometric distortion are provided for automatically by the servo system described in the foregoing.

In Fig. 1, only one group of primary-color phosphor stripes, red; blue; and green, on the color screen of cathode ray tube 1, is shown for simplicity of drawing. In order to prevent dilution of colors during transitory periods of the beam from one stripe to another, a beam-blanking means may be provided, which may simply consist of applying high value negative voltages upon the grid 3, during said transitory periods. This may be done by multiplying the sine wave frequency in block 15, and applying it upon the control grid 3, so phased that, during the negative alternations the beam will be blanked out. In order to avoid the positive peaks from appearing on the viewing screen, the normal bias 29 is so adjusted that these positive peaks drive the grid to normal operating value. This type of operation had been shown in an application by Robert E. McCoy and myself, Serial No. 160,042, filed May 4, 1950, now Patent No. 2,677,723, May 4, 1954. As a simpler arrangement however, the color stripes may be separated by opaque stripes, whereby the beam will not cause visible illumination during transitory periods from one color stripe to the next. Since the color image forming screen is of simple structure, an electron pervious metallic backing, few microns thick, may be easily applied for higher efficiency of picture brightness.

In the type of colored screen shown, it will be noted that the beam will occupy less area in vertical direction for each elemental image, than in the horizontal direction. To equalize this undesired condition, the beam shape may be made oval, as described in the above first mentioned patent issue. However, it is contemplated herein to employ another arrangement, which provides the method of deflecting the beam vertically by an auxiliary deflecting coil, at a high frequency rate, with an amplitude that is equal to three stripe widths. This auxiliary beam-deflecting coil may be very small, and constructionally it may be slipped between the neck of the tube and the main deflection yoke, such for example, as described by Kurt Schlesinger on page 97 of "Electronics." September 1951, the relative portion of the specification of which is hereby made part of this specification, as if fully included herein.

In the case where the presently proposed image reproducing device is employed in conjunction with the NTSC simultaneous color television system, there are used three separate detectors, such as indicated by the numerals 10, 11 and 12. Similarly, in the case where this device is employed in conjunction with my application for color television system, Serial No. 290,723, filed May 29, 1952, now Patent No. 2,683,770, July 13, 1954, there are also used three separate detectors. The outputs of these detectors, in either case, are gated, and operated sequentially by the distributor wave, such for example, as shown in block 9. Distribution waves are known in the previous art. As an alternative however, a distribution wave may be produced by first doubling the frequency of sine wave in block 15, adjusting the amplitude of the doubled wave to approximately half the amplitude of the wave in 15, and combining the two waves at such phases that, when the former wave changes sign, the latter wave also changes sign. The combined output will produce a wave which is an approximation of stair steps in three steps, as shown and described in the above first mentioned application. By utilizing the positive and negative peaks of this stair step wave as separate pulses for gating purposes, it will provide distributory pulses for the red and green detectors. The distributory pulses for the blue detector may then be produced by half-wave rectifying the sine wave in block 15; clipping off the lower parts of the rectified periodic half-cycle waves, so as to compress the widths of these clipped waves; and utilizing these pulses (properly phased with respect to the previously mentioned pulses) as distributory pulses for the blue detector. As a further alternative, the sine wave output of block 15 may be applied upon the gates 10, 11 and 12 separately through three separate branches in three-phase relations with respect to each other, and the peaks of these sine waves clipped at portions where the three waves cross one another in sequence. The distribution waveform, in this case, will be curved at the sides, instead of the ideal straight rise and fall; but at such high frequency switching, straight-sided waveform is difficult to obtain, and it is not necessary for the purpose involved. This type of distribution wave production is the simplest form known and practiced in the art of electronics, and accordingly, further illustrative drawing is not found necessary herein.

Various other sections of Fig. 1, where shown in block diagrams, are considered as conventional, for example, the gate circuits as shown in blocks 10, 11 and 12 are used universally in the art of electronics. As an example however, each gate may comprise a vacuum tube having first and second control grids, so biased that, operation is imparted only when both grids are excited simultaneously; in this case, one receiving the distribution signal, and the other receiving the video signal. These blocks also represent video detectors, the types of which are commonly used in conventional television receivers. The video amplifier in block 13 may be of the type utilized in conventional television receivers; the bandwidth being adjusted to satisfy the particular requirements. The circuitry of horizontal scanning oscillator block 6 is similar to the type utilized in monochrome television sets, although modifications may always be made. The oscillators also provide means for producing beam blanking negative pulses during line retrace periods. A phase inverting circuit, such as block 28, may be utilized to change the negative pulse into positive pulse for the operation of the discharger block which is utilized to discharge any electrical quantity that may have been stored after each line scansion phase comparing wave in block 15 may be referred to the subcarrier wave derived from the U. S. standardized NTSC color television system. Finally, the impedances Z may either consist of inductances or resistances.

Fig. 2 is an arrangement wherein the photoelectric cell 8 may be dispensed with. In such arrangement, the blue phosphor stripes are coated with electron-pervious metallic strips 30, which are all connected eletrically to a common output terminal across an output impedance 31. Thus, each time the beam traverses a metallic strip, there is produced an output pulse across impedance 31, thereby producing the necessary output pulses as described in the foregoing.

Fig. 3 is a modification of Fig. 2, wherein, the metallic strips do not have to be electron-pervious, as they are interposed between the phosphor stripes. Fortunately in this case, the areas where the metallic strips are placed, are opaque areas for suppressing illumination during transition of the beam from one color phosphor to the next, without restoring to blanking out the projected beam. Since in this case the peak of the output pulse is not in phase with the blue phosphor illumination, the comparison wave is phased accordingly with respect to the sequence of primary-color component modulation.

In Fig. 1, the photocell is shown mounted on the funnel structure of the color image tube. A small cell could also be mounted one side of the gun structure, and leads brought, in either case, from the neck end-socket of the tube. The cell could of course be of the multiplier type.

Other various conditions which are relative to this invention are disclosed in the above mentioned patent issues, which as stated previously, are made part of this invention. Accordingly, what I claim is as follows:

1. In a color television system where the frequency of the highest number of image elements to be conveyed per second is predetermined, a form of color image reproducing cathode ray tube which provides the system of selecting and luminescing elemental primary-color component areas of a multi-color luminescing screen in synchronism and in proportion corresponding to a source of repeating groups of pre-arranged sequence of primary-color component information, one group to each image element, comprising in combination the following parts: means for producing an image forming scanning ray; means for forming a scanning raster with said ray; a luminescing screen in the path of said ray, comprising in a pre-arranged sequence of repeating groups of adjacently positioned stripe-like sections of primary-color component areas that substantially cross the lines of the raster, and wherein each color area of a group is adapted to produce one of a primary-color illumination when impacted by the ray during said scanning; means for deriving an electrical pulse from at least one of last-said areas, or a portion thereof, when impacted by the ray, whereby producing output pulses at the periodic rate of above mentioned image elements; a source of repeating groups of primary-color component signals at aforementioned sequence; means for modulating the intensity of said ray by said signals; means for producing a wave at above named predetermined frequency; means for measuring and deriving first and second proportional quantities representative of the differences of frequency and phase between last named wave and said pulses, whereby said quantities representing forward or backward misalignments of component color illuminations with that of primary-color modulations said first quantity having larger time constant than the second quantity; means for adjusting the width-amplitude of said scanning raster by said first quantity until said misalignment approximately subsides, thereby effecting amplitude correction; and means for simultaneously adjusting the ray position parallel to the scanning lines by said second quantity until said misalignment is substantially nullified, thereby effecting correction of said geometric distortion.

2. The system as set forth in claim 1, wherein is included means for blanking said ray during transition periods between elemental illuminations, whereby substantially avoiding dilution of primary-color illuminations on the screen.

3. In a color television image reproducing cathode ray device wherein there is included repeating groups of pre-arranged sequence of adjacently positioned stripe-like first, second and third primary-color component areas that cross the lines of the raster, and wherein each color area of a group is adapted to produce one of a primary-color illumination when impacted by the scanning ray in synchronism with, and in proportion corresponding to a source of repeating groups of primary-color component signals in above mentioned sequence, the system of adjusting the width of the scanning raster, and simultaneously adjusting the geometric distortion of the lines of the raster, which comprises the following: means for producing elemental illuminations in first, second and third primary-colors by said scanning ray on the formed raster; means for modulating the intensity of said ray by the pre-arranged sequence of primary-color components of said source; means for producing a first wave whose peaks are substantially in phase with said second illuminations; means for producing a second wave whose peaks are substantially in phase with the first and third primary-color component signals of said source; means for measuring dissymmetric time overlap between the peaks of the first and second waves and deriving therefrom proportional first and second electrical quantities as representative misalignment of said modulated color-sequence with that of component color illumination, said first quantity having larger time constant than the second quantity; means for adjusting the width-amplitude of said scanning raster by said first quantity until said misalignment approximately subsides, thereby indicating amplitude correction; and means for simultaneously adjusting the ray position parallel to the scanning lines by said second quantity until said misalignment is substantially nullified, thereby effecting correction of said geometric distortion.

4. In a color television system where the frequency of the highest number of image elements to be conveyed per second is predetermined, a form of color image reproducing cathode ray tube, having a face plate, funnel structure, a neck structure, and a ray forming structure inside of the tube, which provides the system of selecting and luminescing elemental primary-color component areas of a multi-color luminescing screen in synchronism and in proportion corresponding to a source of repeating groups of pre-arranged sequence of primary-color component information, one group to each image element, comprising in combination the following parts: means for producing an image forming ray; horizontal and vertical ray-deflecting means for forming a scanning raster with the ray; a pair of electrostatic ray-deflecting plates, arranged for deflecting the ray along the lines of the scanning raster; a luminescing screen in the path of the ray, comprising in a pre-arranged sequence of repeating groups of adjacently positioned stripe-like sections of primary-color component areas that substantially cross the lines of the raster, and wherein each color area of a group is adapted to produce one of a primary color illumination when impacted by the ray during said scanning; means for deriving an electrical pulse from at least one of last-said areas, or a portion thereof, when impacted by the ray, whereby producing output pulses at the periodic rate of above mentioned image elements; a source of repeating groups of primary-color component signals of aforementioned sequence; means for modulating the intensity of said ray by said signals; means for producing a wave at above named predetermined frequency; first and second phase detecting means, and means therefor for detecting and producing output quantities representative of phase variation between said electrical pulses and said wave from a predetermined reference phase relation, as representative quantities of forward or backward misalignment between component color illumination and primary-color modulation; amplitude control means for said horizontal ray-deflecting means; means for applying the output quantities of the first phase detector upon said amplitude control means at slow amplitude-resolution rate, whereby to adjust the amplitude of line scanning, and thereby adjusting the frequency of said electrical pulses to said predetermined frequency rate; means for applying the output quantities of the second detector upon the electrostatic plates for retarding or advancing the moving position of the ray in rapid amplitude-resolution rate, whereby to adjust the ray position for luminescing primary-color component areas in synchronism with primary-color component modulation; and means for blanking the ray during transitory periods of elemental primary-color illuminations, whereby to avoid dilution of said illuminations.

5. The system as set forth in claim 4, wherein is included an electron-pervious metallic strip superposed over one of predetermined stripe-like primary-color component area in each of said groups; a common electrical connection between all of said metallic strips; an output impedance across said common connection, whereby an output pulse is produced across this impedance each time said ray traverses a metallic strip.

6. The system as set forth in claim 4, wherein said stripe-like primary-color component areas of the screen are separated by opaque stripe-like areas, whereby to provide said ray blanking.

7. The system as set forth in claim 4, wherein said stripe-like primary-color component areas of the screen are separated by opaque stripe-like areas, whereby to provide said ray blanking; metallic strips applied in said opaque areas in the path of said ray, equally displaced and one strip for each group aforesaid; a common electrical connection for all of said strips; an output impedance across said common connection, for obtaining said electrical pulse each time the ray impacts a metallic strip; and phasing means for obtaining the proper phaseal relation between the electrical pulses and said wave.

References Cited in the file of this patent

UNITED STATES PATENTS

| | | |
|---|---|---|
| 2,545,325 | Weimer | Mar. 31, 1951 |
| 2,587,074 | Sziklai | Feb. 26, 1952 |
| 2,621,244 | Landon | Dec. 9, 1952 |
| 2,667,534 | Creamer | Jan. 26, 1954 |
| 2,706,216 | Lesti | Apr. 12, 1955 |
| 2,713,606 | Sziklai | July 19, 1955 |
| 2,725,420 | Zworykin | Nov. 29, 1955 |